(12) United States Patent
Ruan et al.

(10) Patent No.: US 11,157,156 B2
(45) Date of Patent: Oct. 26, 2021

(54) SPEED-BASED CONTENT RENDERING

(71) Applicant: International Business Machines Corporation, Armonk, NY (US)

(72) Inventors: Qi Ruan, Ningbo (CN); Jian Hua Lv, Ningbo (CN); Yan Feng Han, Ningbo (CN); Yun Ze Miao, Ningbo (CN); Kai Feng Wang, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 16/429,100

(22) Filed: Jun. 3, 2019

(65) Prior Publication Data

US 2020/0379619 A1    Dec. 3, 2020

(51) Int. Cl.

| | |
|---|---|
| *G06F 3/0485* | (2013.01) |
| *G06F 9/451* | (2018.01) |
| *G06F 40/14* | (2020.01) |
| *G06F 40/106* | (2020.01) |
| *G06F 40/103* | (2020.01) |
| *G06F 40/205* | (2020.01) |
| *G06F 3/0487* | (2013.01) |
| *G06F 3/033* | (2013.01) |
| *G06F 3/0481* | (2013.01) |
| *G06F 3/0482* | (2013.01) |
| *G06F 3/0484* | (2013.01) |

(52) U.S. Cl.
CPC ............ *G06F 3/0485* (2013.01); *G06F 3/033* (2013.01); *G06F 3/0481* (2013.01); *G06F 3/0482* (2013.01); *G06F 3/0487* (2013.01); *G06F 3/04845* (2013.01); *G06F 3/04855* (2013.01); *G06F 9/451* (2018.02); *G06F 40/103* (2020.01); *G06F 40/106* (2020.01); *G06F 40/14* (2020.01); *G06F 40/205* (2020.01)

(58) Field of Classification Search
CPC .. G06F 3/0485; G06F 3/04855; G06F 3/0482; G06F 3/04845; G06F 3/0487; G06F 3/033; G06F 3/0481; G06F 9/451; G06F 40/103; G06F 40/106; G06F 40/14; G06F 40/205
See application file for complete search history.

(56) References Cited

U.S. PATENT DOCUMENTS

| | | |
|---|---|---|
| 8,683,377 B2 | 3/2014 | Zuverink |
| 9,086,791 B2 | 7/2015 | Ishak |
| 9,329,759 B1 * | 5/2016 | Hill ............... G06F 3/04842 |
| 9,436,374 B2 | 9/2016 | Marr |
| 9,727,223 B2 | 8/2017 | Cho |
| 2002/0109709 A1 | 8/2002 | Sagar |

(Continued)

OTHER PUBLICATIONS

"Magic Buttons to Collapse/Expand Sections & Scroll To Top" downloaded from the internet on Apr. 15, 2019, 5 pages, <https://community.quickbase.com/quickbase/topics/magic-buttons-to-collapse-expand-sections-scroll-to-top>.

*Primary Examiner* — Chau T Nguyen
(74) *Attorney, Agent, or Firm* — David B. Woycechowsky

(57) ABSTRACT

Methods, computer program products, and systems for content rendering are provided. An exemplary method comprises obtaining a current scrolling speed; determining a current speed level based on the current scrolling speed; determining a current rendering mode based on the determined current speed level; and rendering at least one component based on the current rendering mode.

3 Claims, 6 Drawing Sheets

(56) References Cited

U.S. PATENT DOCUMENTS

| | | | |
|---|---|---|---|
| 2008/0165141 A1* | 7/2008 | Christie | G06F 3/0482 345/173 |
| 2008/0222558 A1* | 9/2008 | Cho | G06F 3/0485 715/784 |
| 2011/0119578 A1 | 5/2011 | Schwartz | |
| 2011/0154196 A1* | 6/2011 | Icho | G06F 16/54 715/702 |
| 2014/0155124 A1* | 6/2014 | Lee | G06F 3/0488 455/566 |
| 2015/0109532 A1 | 4/2015 | Lewis | |
| 2015/0181013 A1 | 6/2015 | Mit | |
| 2015/0339006 A1* | 11/2015 | Chaland | G06F 3/0485 715/835 |
| 2017/0025096 A1* | 1/2017 | Fan | H04L 51/04 |
| 2017/0351395 A1* | 12/2017 | Giannopoulos | G06F 3/04845 |
| 2018/0210621 A1* | 7/2018 | Lee | G06F 3/0485 |
| 2019/0147503 A1* | 5/2019 | Burriesci | G06F 16/958 705/14.73 |
| 2019/0250787 A1* | 8/2019 | Shoji | G09G 5/36 |

* cited by examiner

SPEED-BASED CONTENT RENDERING

BACKGROUND

The present application relates to information processing, and more specifically, to methods, systems and computer program products for content rendering. "Content" refers to data representing human understandable information like text, audio, haptic information or graphics. "Rendering" refers to the presentation of the content to the user in human understandable form and format.

Vertical scrolling is known. This occurs when text that is displayed as an ordered series of horizontal lines of text is vertically scrolled across, and eventually off, of a display area (for example, a window, or a full display area of a display device). In many cases, vertical scrolling is caused by user input, such as by a mouse manipulation, a keyboard manipulation or gesture(s) on a touchscreen display device. Vertical scrolling speed may be measured by how many lines of text scroll off (or onto) the display area per unit time. Vertical scrolling may occur in an upwards or downwards direction. Vertical scrolling should not be confused with horizontal scrolling (which is sometimes referred to as a "text crawl"), where a single horizontal line of text scrolls in a horizontal direction.

With the wide acceptance and the use of Internet and related technologies, users nowadays rely heavily on the Internet to retrieve information. However, it often takes a lot of effort to retrieve information of interest.

US patent application 2015/0109532 ("Lewis"), at paragraph 20, discloses as follows: "Implementations of the present disclosure customize the captioning for the media item that is being presented in the media UI based on how the media item is being rendered. For example, if the video is playing while the mobile device is in a portrait (vertical) orientation and is playing using the top third of the display of the mobile device, the captioning may have a small font size and the captioning may be animated. For example, the captioning may be scrolling across the horizontal length of the video. In another example, if the video is playing while the mobile device is in a landscape (horizontal) orientation and is playing using 90% of the display of the mobile device, the captioning may have a large font size and the captioning may not be animated." As applicant best understands this disclosure, the rendering mode that is selected will determine whether certain content appears, alternatively, as: (i) horizontally scrolling content: or (ii) non-scrolling content.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

According to an aspect of the present invention, there is a method, system and/or computer program product for performing the following operations (not necessarily in the following order): (i) receiving first user input; (ii) responsive to the receipt of the first user input, vertically scrolling content, including horizontal lines of text, through an active display area on a display of a computer display device; (iii) during the scrolling, determining a current vertical scrolling speed value expressed in terms of number of horizontal lines of text vertically scrolled off of the active display area per unit time; (iv) selecting a first rendering mode from a plurality of rendering modes based, at least in part, upon the current vertical scrolling speed value; and (iv) rendering at least a portion of the content in the active display area according to the first rendering mode. In some embodiments, the active display area is a window that occupies less than all of the active display area. In some embodiments: (i) the content includes a plurality of Document Object Model nodes each respectively having an associated priority value; and (ii) the rendering modes of the plurality of rendering modes respectively correspond to different subsets of priority values for DOM nodes of the content that are displayed under the respectively corresponding rendering mode (an example of this is discussed in detail, below, in connection with FIG. 7).

In one illustrative embodiment of the present invention, there is provided a computer implemented method. The method comprises obtaining a current scrolling speed; determining a current speed level based on the current scrolling speed; determining a current rendering mode based on the determined current speed level; and rendering at least one component based on the current rendering mode.

Computer program products and computer systems are also provided.

These and other features and advantages of the present invention will be described herein or will become apparent to those of ordinary skill in the art in view of, the following detailed description of the example embodiments of the present invention.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Information nowadays is more and more being acquired by mobile computing devices with the substantial increase in computing power of mobile computing devices. However, due to the limited screen size of mobile computing devices, users sometimes suffer from the process of finding 'target' information that users are interested from a large amount of information retrieved as it usually takes a lot of efforts in scrolling contents shown on the limited screen back and forth to locate the information that are interested due to the reasons that human eyes cannot easily see all the details when an object is moving fast. It would be helpful and effective if users can locate 'target' information easily when scrolling.

Embodiments of the invention are targeting the problems stated out above and can be deployed on cloud computer systems which will be described in the following. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (for example, mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
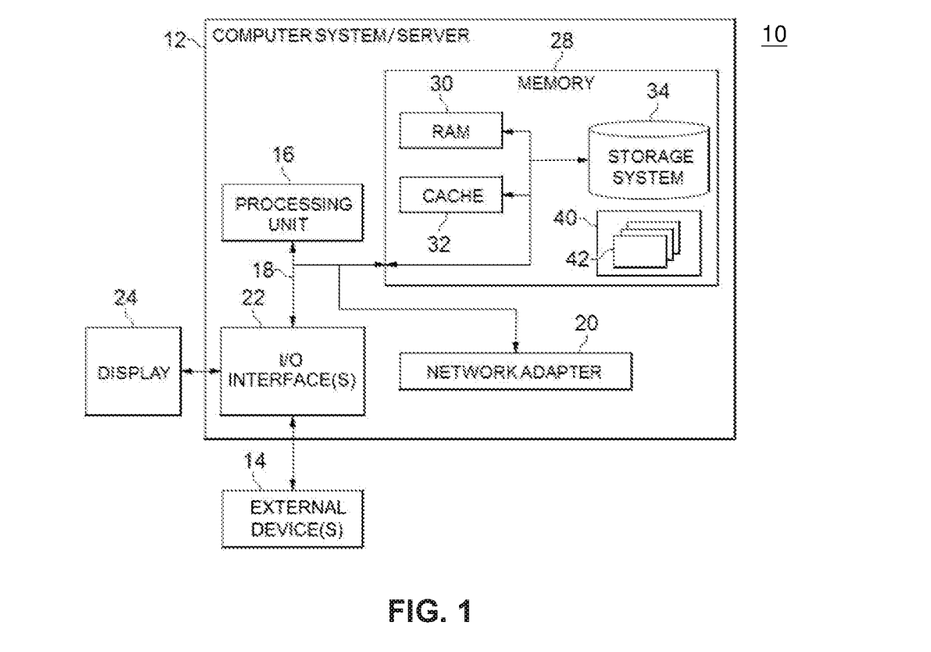
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (for example, a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (for example, at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (for example, network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (for example, the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
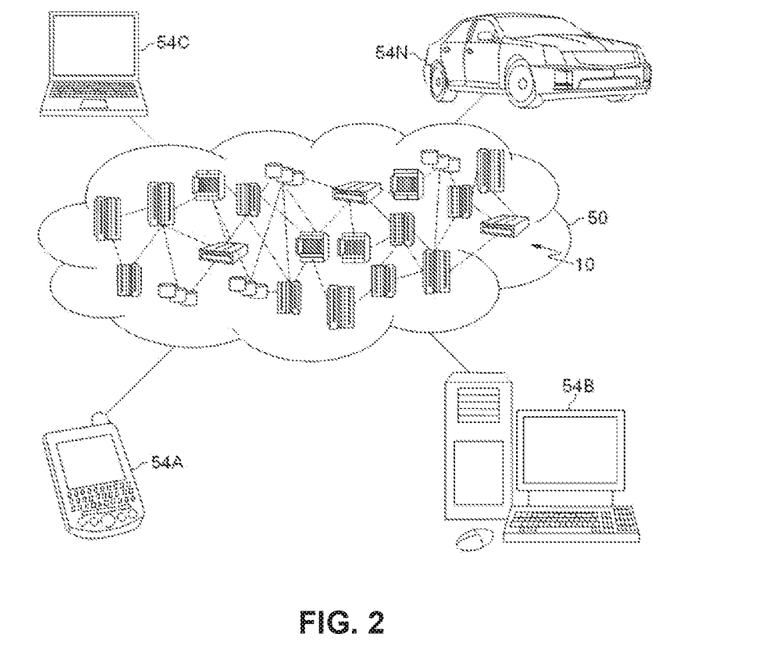
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (for example, using a web browser).

Figure 3:
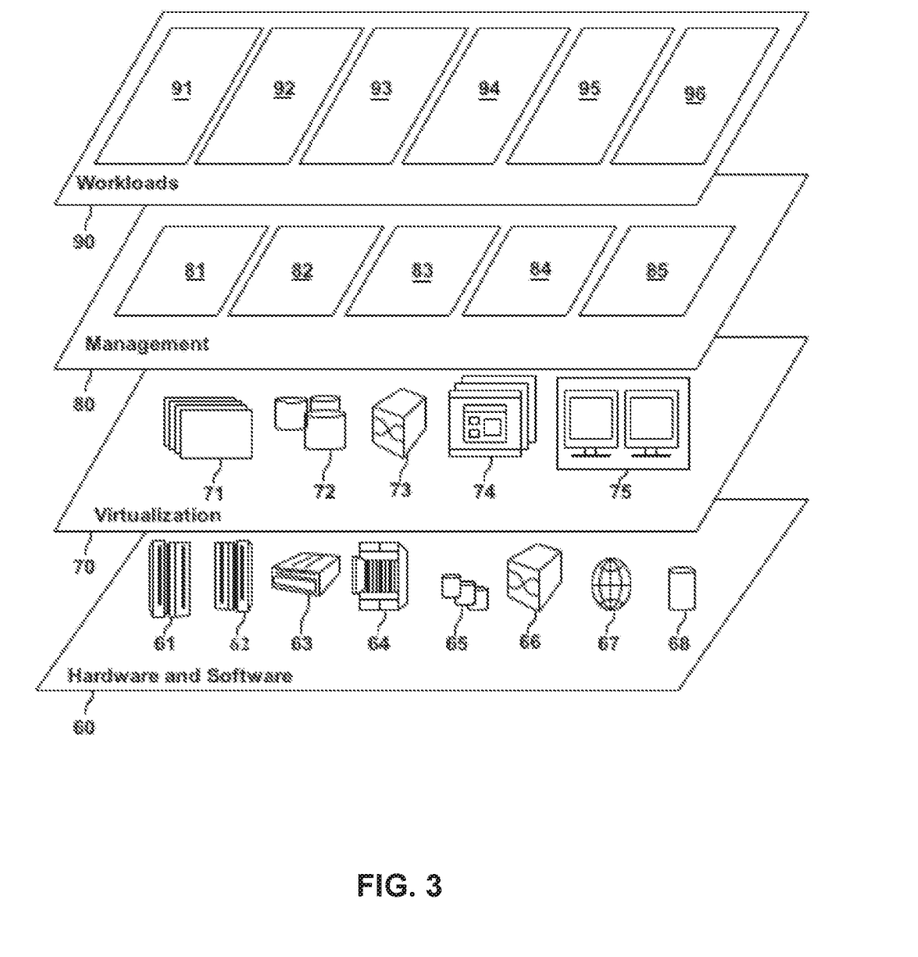
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content rendering control 96 according to embodiments of the invention.

Embodiments of the present invention ease the process of finding target information of a user by adopting a content rendering control which will be described in detail in the following with references to FIG. 4 to FIG. 5.

Figure 4:
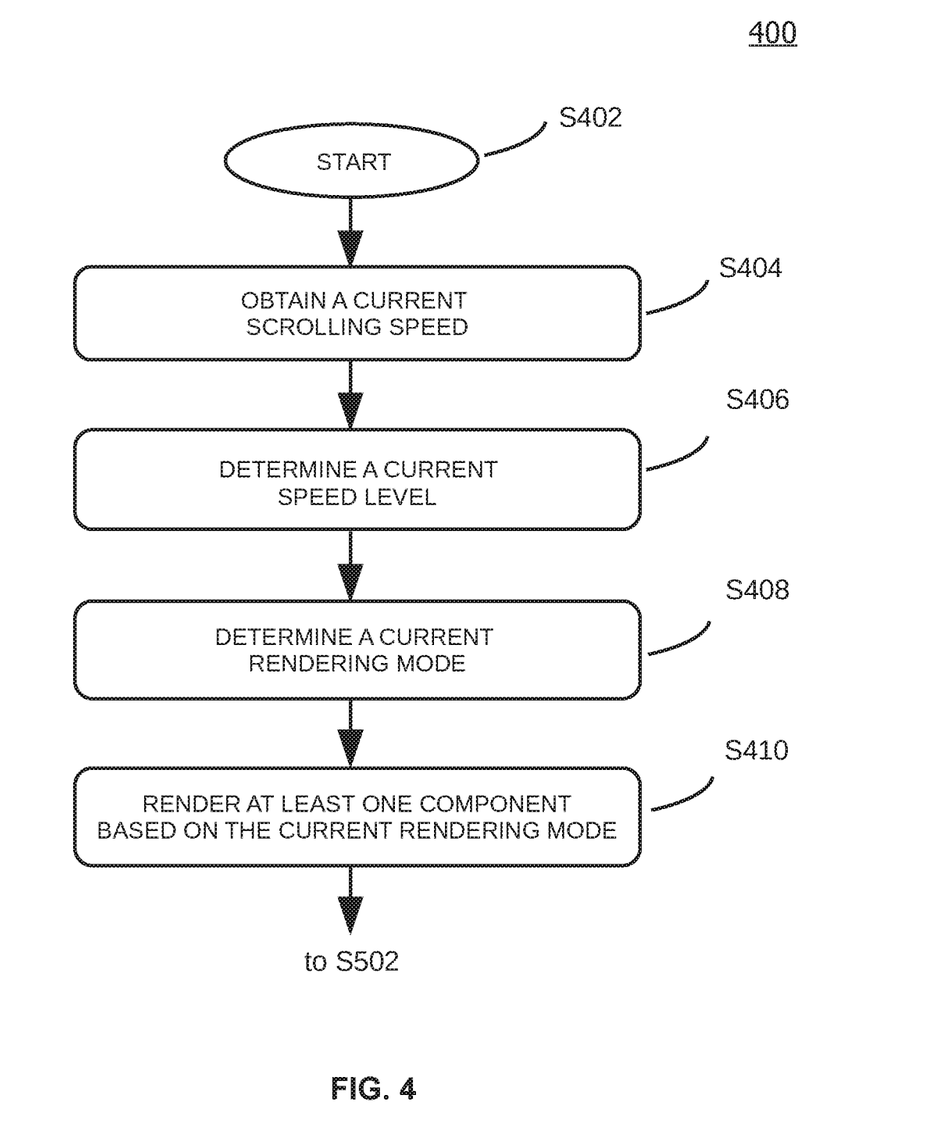
FIG. 4 depicts a flowchart of an exemplary method 400 for content rendering according to an embodiment of the present invention.

Referring now to FIG. 4, a flowchart of an exemplary method 400 for content rendering according to an embodiment of the present invention is depicted.

Method 400 begins at step S402 and then flows to step S404, in which a current scrolling speed is obtained. The current scrolling speed, which refers to the current scrolling speed of contents shown on the screen, can be obtained by measuring the velocity of a current scroll event that would produce a number which will represent the speed (the distance from scrolling point A to point B relative to the time it took). This may be implemented, for example, by attaching a scroll event via jQuery and use a combination of timestamps and scroll offsets to determine the scrolling speed by comparing the offset/time to the last scroll event before. The measurement of the scrolling speed may be integrated into browser functions by way of a browser extension. The detection of a scroll event and the measurement of a scrolling speed can also utilize any other appropriate approaches existing nowadays or developed in the future and should not adversely limit the scope of the invention.

Then a current speed level is determined in step S406 based on the obtained current scrolling speed. According to an embodiment of the present invention, a speed level is a pre-defined speed interval which comprises a higher speed limit and a lower speed limit. A speed level may be represented as an integer corresponding to the speed interval. If a scrolling speed falls between the higher speed limit and the lower speed limit of a certain speed interval, the integer corresponding to the speed interval can be determined as the current speed level. The mapping between scrolling speeds and corresponding speed levels may be pre-configured and stored in a certain location so that it may be retrieved and utilized to determine the speed level of a certain scrolling speed. An example of the mapping is shown in the following.

TABLE 1

Mapping between a speed level and a scroll speed

| Speed Level | Scrolling Speed (v) |
|---|---|
| 0 | $0 =< v < v_1$ |
| 1 | $v_1 =< v < v_2$ |
| 2 | $v_2 =< v < v_3$ |
| ... | ... |

As shown in Table 1, a scrolling speed v that falls between 0 and $v_1$ (equals or greater than 0 but smaller than $v_1$) will be determined as Speed Level 0. Similarly, a scrolling speed v that falls between $v_1$ and $v_2$ (equals or greater than $v_1$ but smaller than $v_2$) will be determined as Speed Level 1. Here it needs to be pointed out the above example in Table 1 is merely an example where it shows in Table 1 that the higher the scrolling speed is, the greater the integer that represents the speed level is, it may be vice versa. Also, it should be pointed out the mapping shown above is merely an example, a speed level, as well as the relationship between a speed level and a scrolling speed may be represented as any other appropriate formats to serve the purpose.

With the above mapping, a current speed level could be easily determined by comparing the obtained current scrolling speed with the pre-defined speed intervals in the mapping. For example, if the current scrolling speed obtained falls into the speed interval of $v_1$ to $v_2$, it can be determined that the current speed level is 1. Similarly, if the current scrolling speed obtained falls into the speed interval of $v_2$ to $v_3$, it can be determined that the current speed level is 2.

The method 400 then flows to step S408, in which a current rendering mode is determined based on the determined current speed level. A rendering mode, according to an embodiment of the present invention, defines how contents of a certain component are reduced with respect to the rendering mode relative to the original contents of the component. A component, according to an embodiment of the present invention, comprises a plurality of Document Object Model (DOM) nodes that together constitute as a subtree of the DOM tree of the resource a user is trying to access. A component, when rendered, may comprise one or more user interface elements, one or more content bodies and other possible elements. The composition of a component (that is, what DOM nodes are included in a component) may be pre-configured by the provider of the resource, or may be determined dynamically upon rendering, alternatively.

According to an embodiment of the invention, a certain speed level may correspond to a certain rendering mode and different speed levels may correspond to different rendering modes. According to an embodiment of the invention, a plurality of speed levels may correspond to one rendering mode. According to an embodiment of the invention, a component may be associated with at least one rendering mode. In each of the at least one rendering mode associated with the component, it is defined how the contents of the component are reduced with respect to respective rendering modes relative to the original contents of the component. According to an embodiment of the present invention, each of the DOM nodes comprised in the component is associated with a speed level attribute which controls the rendering of respective DOM nodes. Only when the speed level attribute associated with a DOM node equals or is greater than the current speed level, will the DOM node be rendered. In another word, if the associated speed level attribute is smaller than the current speed level, the DOM node will not be rendered (reduced) when rendering.

The mapping between the speed levels and corresponding rendering modes may be pre-configured and stored in a certain location so that it may be retrieved and utilized to determine the current rendering mode. An example of the mapping is shown in the following.

TABLE 2

Mapping between a speed level and a rendering mode

| Speed Level | Rendering Mode | Contents Reduced |
|---|---|---|
| 0 | 0 | None |
| 1 | 1 | DOM nodes with speed level attribute <1 |
| 2 | 2 | DOM nodes with speed level attribute <2 |
| ... | ... | ... |

As it is shown in the example above, when rendering, DOM nodes with speed level attribute smaller than Speed Level 1 will be reduced in Rendering Mode 1, and similarly, DOM nodes with speed level attribute smaller than Speed Level 2 will be reduced when rendering in Rendering Mode 2. While in Rendering Mode 0, no DOM nodes will be reduced. It should be pointed out that the mapping shown above is merely an example, a rendering mode, the relationship between a speed level and a rendering mode, as well as what is defined in a rendering mode may be represented as any other appropriate formats to serve the purpose.

The method 400 then flows to step S410, in which at least one component is rendered based on the determined current rendering mode. For example, if the determined current rendering mode is Rendering Mode 1 in the example of Table 2, the at least one component will be rendered in Rendering Mode 1, which means only those DOM nodes comprised in the at least one component with speed level attribute smaller than Speed Level 1 will be reduced when rendering, and those DOM nodes comprised in the at least one component with speed level attribute equal or are greater than Speed Level 1 will be rendered. If the determined current rendering mode is Rendering Mode 2 in the example of Table 2, the at least one component will be rendered in Rendering Mode 2, which means only those DOM nodes comprised in the at least one component with speed level attribute smaller than Speed Level 2 will be reduced when rendering, and those DOM nodes comprised in the at least one component with speed level attribute equal or are greater than Speed Level 2 will be rendered.

According to an embodiment of the present invention, the higher the speed level is, the more the contents are reduced, as shown in the above example of Table 2 where the configuration of speed level is proportional to the amount of the contents reduced. According to an embodiment of the present invention, the lower the speed level is, the more the contents are reduced if it is configured that the higher the scrolling speed is, the smaller the integer that represents the speed level is. The format and the value of the configuration of speed levels may adopt any appropriate forms as long as the contents of a component will be reduced more with the increase of the scrolling speed to ensure that the contents with higher importance or priority will be rendered. For example, contents with higher importance or priority may be associated with higher speed level attributes in the above example of Table 1 and Table 2.

According to an embodiment of the invention, the at least one rendering mode associated with the at least one component is pre-configured by a content provider of the at least one component. The content provider defines what contents of the at least one component is with higher importance or priority. Referring to the example of FIG. 7 with exemplary visual effects of content rendering according to an embodiment of the present invention depicted, the content provider may define that DOMs nodes corresponding to UI elements UI1 and UI2 and Content 2 are with speed level attribute 0, which means only when the current speed level is 0, these DOM nodes will be rendered. If the current speed level is greater than 0, these DOM nodes will be reduced when rendering. DOM node corresponding to Content 1 is defined with speed level attribute 1, which means only when the current speed level is not greater than 1, the corresponding DOM node will be rendered. If the current speed level is greater than 1, the DOM node will be reduced when rendering. DOM nodes corresponding to Content 3 and Content 4 is defined with speed level attribute 2, which means only when the current speed level is not greater than 2, the corresponding DOM node will be rendered. If the current speed level is greater than 2, these DOM nodes will be reduced when rendering.

According to an embodiment of the invention, the at least one rendering mode associated with the at least one component may be adjusted by a behavior model of a user of the at least one component. The user behavior model may be built based on several factors that may related to user interests. These factors may include time spent on a certain component, visits on a certain component, scroll direction changes etc. For example, given a certain focus area on the screen (typically the center of the screen), a cumulative duration of components appear in the focus area is recorded. The speed level attributes of those DOM nodes inside a component with longer cumulative duration will increase over time. Similarly, the speed level attributes of those DOM nodes inside a component with more user interactions, for example click, will increase over time. If a scrolling direction is changed, the speed level attributes of those DOM nodes inside a component that stops at the focus area after the scrolling direction change will increase over time.

The method 400 flows to step S512 ends after the at least one component is rendered based on the determined current rendering mode, or responsive to no change of scroll speed is detected.

Figure 5:
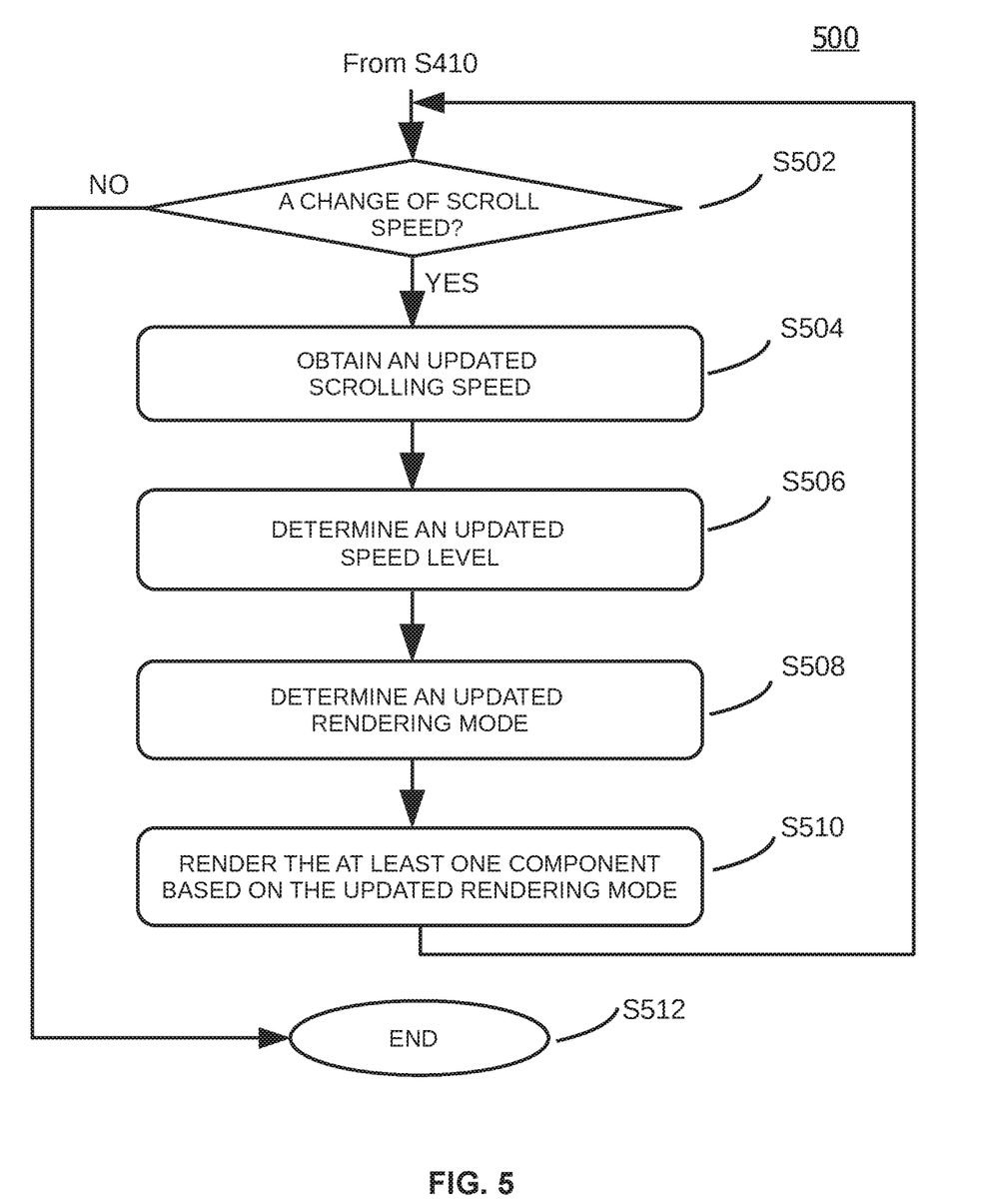
FIG. 5 depicts a flowchart of an exemplary method 500 for content rendering according to an embodiment of the present invention.

Now, referring to FIG. 5, in which a flowchart of an exemplary method 500 for content rendering according to an embodiment of the present invention is depicted. According to an embodiment of the invention, after the at least one component is rendered based on the determined current rendering mode at step S410, it is further determined in step S502 whether a change of the current scrolling speed is detected. If it is determined that a change of the current scrolling speed is detected, an updated scrolling speed is obtained at step S504, for example, by measuring the velocity of a current scroll event that would produce a number which will represent the speed, similar to step S402 in FIG. 4, as stated out in the above. Then an updated speed level is determined in step S506 based on the updated scrolling speed, similar to the step S406 in FIG. 4. Further, an updated rendering mode is then determined in step S508 based on the updated speed level, similar to the step S408 in FIG. 4. Hence the at least one component is rendered based on the updated rendering mode determined in step S510, similar to step S410 in FIG. 4. Then method 500 flows to step S502 where whether a change of scrolling speed is further detected or to step S512 and ends.

Figure 6:
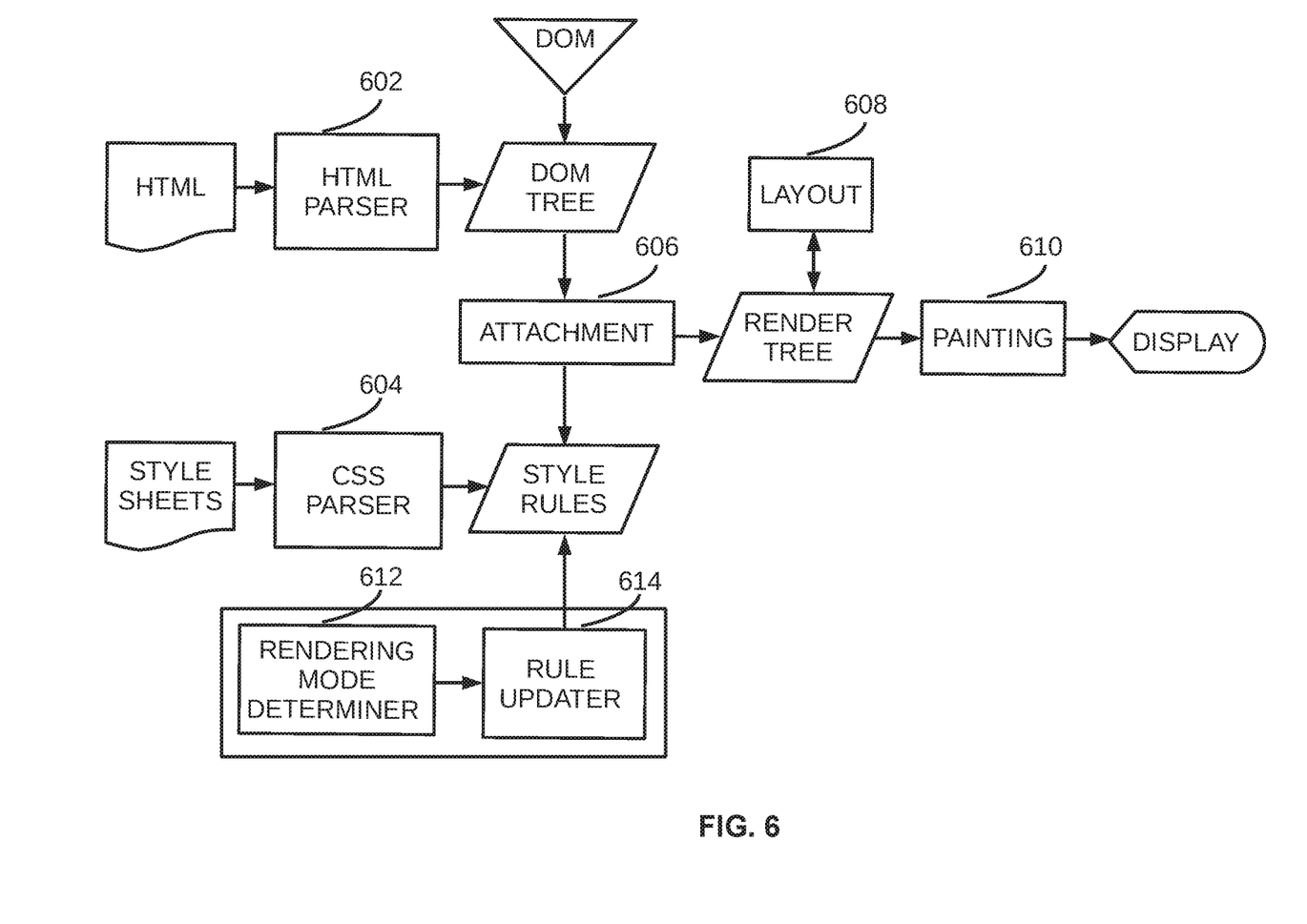
FIG. 6 depicts a block diagram of an exemplary system of content rendering in connection with the exemplary methods of FIG. 4 and FIG. 5.

Now referring to FIG. 6, which depicts a block diagram of an exemplary system of content rendering in connection with the exemplary methods of FIG. 4 and FIG. 5. The exemplary system of content rendering comprises HTML parser 602, CSS parser 604, attachment module 606, layout module 608 and painting module 610 which are similar to those in the existing systems of content rendering. The HTML parser 602 and the CSS parser 604 work same as existing systems in which the HTML parser 602 parses HTML code and generates a content tree, typically a DOM tree and the CSS parser 604 parses style sheets and generates style rules which specify the presentation of DOM nodes in the content tree.

Different from existing systems of content rendering, embodiments of the present invention introduce a content rendering control which comprises a rendering mode determiner 612 and a rule updater 614. The rendering mode determiner 612 determines a current rendering mode based on a current speed level that is determined based on an obtained current scrolling speed. According to an embodiment of the present invention, the current scrolling speed may be obtained for example from within browser functions or a browser extension, as described in the above. A current speed level may be determined by comparing the current scrolling speed with a scroll speed to speed level mapping retrieved from a certain location, as described in the above. The rendering mode determiner 612 then determines the current rendering mode with the use of speed level to rendering mode mapping, as described in the above. Then the rule updater 614 updates the style rules generated by CSS parser 604 by setting those DOM nodes with speed level attributes smaller than the determined current speed level as 'hidden'.

After the style rules being updated by the rule updater 614, the exemplary system of content rendering then constructs a rendering tree by combing the DOM tree and the updated style rules. The layout module 608 then gives each DOM node the exact coordinates where it should appear on the screen based on the constructed rendering tree and then the painting module 610 will traverse each DOM node and paint them on the screen.

Upon detecting a change of current scrolling speed, the rendering mode determiner 612 further determines an updated rendering mode based on an updated speed level that is determined based on an obtained updated scrolling speed. Then the rule updater 614 further updates the style rules generated by CSS parser 604 by setting those DOM nodes with speed level attributes smaller than the determined updated speed level as 'hidden'. The exemplary system of content rendering then constructs an updated rendering tree by combing the DOM tree and the further updated style rules. Then the layout module 608 then gives each DOM node the exact coordinates where it should appear on the screen based on the updated rendering tree and then the painting module 610 will traverse each DOM node and paint them on the screen.

Figure 7:
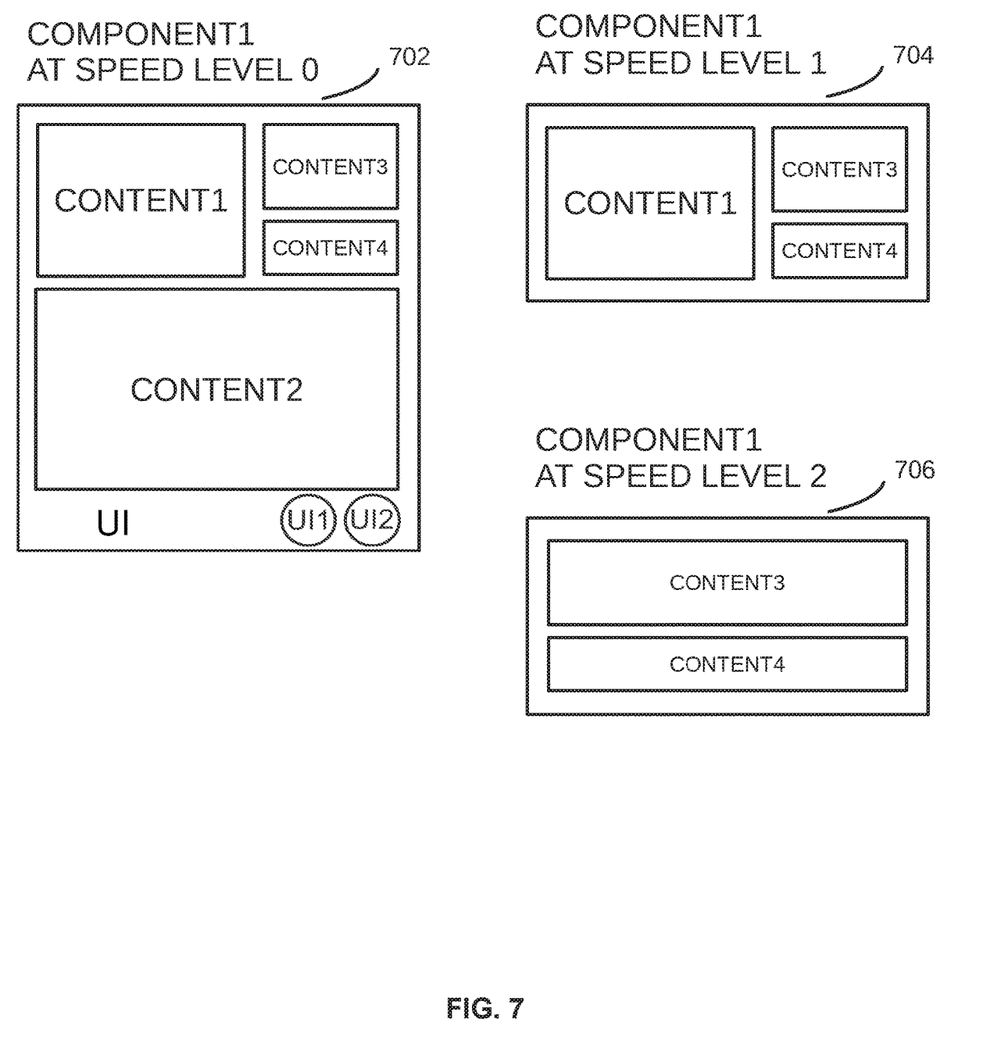
FIG. 7 depicts exemplary visual effects of content rendering according to an embodiment of the present invention.

Referring again to the FIG. 7, which depicts exemplary visual effects of content rendering according to an embodiment of the present invention. DOMs nodes corresponding to UI elements UI1 and UI2 and Content 2 are with speed level attribute 0, which means only when the current speed level is 0, these DOM nodes will be rendered. If the current speed level is greater than 0, these DOM nodes will be reduced when rendering. DOM node corresponding to Content 1 is defined with speed level attribute 1, which means only when the current speed level is not greater than 1, the corresponding DOM node will be rendered. If the current speed level is greater than 1, the DOM node will be reduced when rendering. DOM nodes corresponding to Content 2 and Content 4 is defined with speed level attribute 2, which means only when the current speed level is not greater than 2, the corresponding DOM node will be rendered. If the current speed level is greater than 2, these DOM nodes will be reduced when rendering. When the determined current speed level is 0, as it is not greater than the speed level attributes of UI elements UI1 and UI2, Content 1, Content 2, Content 3 and Content 4, all of them are rendered, as shown in the left of FIG. 7. When the determined current speed level is 1, as it is greater than the speed level attributes of UI elements UI1 and UI2, and Content 2, but not greater than the speed level attributes of Content 1, Content 3 and Content 4, UI elements UI1 and UI2, and Content 2 are reduced when rendering, Content 1, Content 3 and Content 4 are rendered, as shown in the right above of FIG. 7. When the determined current speed level is 2, as it is greater than the speed level attributes of UI elements UI1 and UI2, Content 1 and Content 2, but not greater than the speed level attributes of Content 3 and Content 4, UI elements UI1 and UI2, Content 1 and Content 2 are reduced when rendering, Content 3 and Content 4 are rendered, as shown in the right below of FIG. 7.

It should be noted that the content rendering according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method (CIM) comprising:
   receiving first user input;
   responsive to the receipt of the first user input, scrolling content, through an active display area on a display of a computer display device, with the content including a plurality of Document Object Model (DOM) nodes each respectively having an associated priority value;
   during the scrolling, determining a current scrolling speed value; and
   rendering the scrolling content as it scrolls through the active display area so that the plurality of DOM nodes are selectively rendered, or selectively not rendered, as they respectively scroll through the active display area based on the scrolling speed value and further on the priority values respectively associated with the DOM nodes of the plurality of DOM nodes.

2. A computer program product (CPP) comprising:
   a set of storage device(s) with each storage device including a set of storage medium(s); and
   computer code collectively stored on the set of storage device(s), with the computer code including data and instructions for causing a processor(s) set to perform the following operations:
      receiving first user input,
      responsive to the receipt of the first user input, scrolling content, through an active display area on a display of a computer display device, with the content including a plurality of Document Object Model (DOM) nodes each respectively having an associated priority value, during the scrolling, determining a current scrolling speed value, and rendering the scrolling content as it scrolls through the active display area so that the plurality of DOM nodes are selectively rendered, or selectively not rendered, as they respectively scroll through the active display area based on the scrolling speed value and further on the priority values respectively associated with the DOM nodes of the plurality of DOM nodes.

3. A computer system (CS) comprising:

a processor(s) set;

a set of storage device(s) with each storage device including a set of storage medium(s); and computer code collectively stored on the set of storage device(s), with the computer code including data and instructions for causing the processor(s) set to perform the following operations:

receiving first user input, responsive to the receipt of the first user input, scrolling content, through an active display area on a display of a computer display device, with the content including a plurality of Document Object Model (DOM) nodes each respectively having an associated priority value, during the scrolling, determining a current scrolling speed value, and rendering the scrolling content as it scrolls through the active display area so that the plurality of DOM nodes are selectively rendered, or selectively not rendered, as they respectively scroll through the active display area based on the scrolling speed value and further on the priority values respectively associated with the DOM nodes of the plurality of DOM nodes.

* * * * *